United States Patent
Park et al.

(10) Patent No.: US 9,684,439 B2
(45) Date of Patent: Jun. 20, 2017

(54) MOTION CONTROL TOUCH SCREEN METHOD AND APPARATUS

(75) Inventors: Yong-gook Park, Yongin-si (KR); Ju-il Eom, Suwon-si (KR); Ji-su Jung, Chungcheongbuk-do (KR); Kuk-hyun Han, Daejeon (KR)

(73) Assignee: Samsung Electronics Co., Ltd (KR)

( * ) Notice: Subject to any disclaimer, the term of this patent is extended or adjusted under 35 U.S.C. 154(b) by 132 days.

(21) Appl. No.: 13/228,059

(22) Filed: Sep. 8, 2011

(65) Prior Publication Data
US 2012/0056837 A1     Mar. 8, 2012

(30) Foreign Application Priority Data

Sep. 8, 2010   (KR) .................. 10-2010-0088041

(51) Int. Cl.
| | | |
|---|---|---|
| *G06F 3/0485* | (2013.01) | |
| *G06F 3/041* | (2006.01) | |
| *G06F 3/0488* | (2013.01) | |
| *G06F 3/0484* | (2013.01) | |

(52) U.S. Cl.
CPC .......... *G06F 3/0485* (2013.01); *G06F 3/0412* (2013.01); *G06F 3/0414* (2013.01); *G06F 3/0488* (2013.01); *G06F 3/04845* (2013.01); *G06F 2203/04105* (2013.01); *G06F 2203/04808* (2013.01)

(58) Field of Classification Search
CPC .... G06F 3/0485; G06F 1/1626; G06F 3/0202; G06F 3/0488; G06F 3/0414; G06F 3/041; G06F 3/0412; G06F 2203/0335; G06F 3/0481; G06F 3/04845; G06F 2203/04105; G06F 3/0487

USPC ................................ 715/863; 345/173–178; 178/18.01–20.04; 463/39–36
See application file for complete search history.

(56) References Cited

U.S. PATENT DOCUMENTS

| | | | | |
|---|---|---|---|---|
| 4,056,713 | A * | 11/1977 | Quinn ...................... | G09G 1/08 315/367 |
| 5,565,887 | A * | 10/1996 | McCambridge .... | G06F 3/04892 345/157 |
| 6,597,347 | B1 * | 7/2003 | Yasutake ....................... | 345/173 |
| 7,331,245 | B2 * | 2/2008 | Nishimura et al. ...... | 73/862.046 |
| 7,391,410 | B2 | 6/2008 | Lutnaes | |

(Continued)

FOREIGN PATENT DOCUMENTS

| | | |
|---|---|---|
| EP | 2 237 142 | 10/2010 |
| JP | 2001-290585 | 10/2001 |

(Continued)

OTHER PUBLICATIONS

Australian Examination Report dated Mar. 31, 2014 in a counterpart Application No. 2011299695.

(Continued)

*Primary Examiner* — Sanjiv D Patel
(74) *Attorney, Agent, or Firm* — The Farrell Law Firm, P.C.

(57) ABSTRACT

An apparatus and method of controlling a motion of an object on a touch screen of a device including recognizing pressures at least two positions on the touch screen of the device, and controlling a motion of the object on the touch screen using a difference in pressure between the at least two recognized positions.

18 Claims, 11 Drawing Sheets

(56) References Cited

U.S. PATENT DOCUMENTS

| | | | |
|---|---|---|---|
| 7,551,163 B1* | 6/2009 | Dotson | G06F 3/0383 178/18.01 |
| RE40,891 E * | 9/2009 | Yasutake | G06F 3/0338 178/18.01 |
| 9,244,562 B1* | 1/2016 | Rosenberg | G06F 3/04847 |
| 2006/0125799 A1 | 6/2006 | Hillis et al. | |
| 2006/0209039 A1 | 9/2006 | Destura et al. | |
| 2008/0165132 A1 | 7/2008 | Weiss et al. | |
| 2008/0180405 A1 | 7/2008 | Han et al. | |
| 2009/0058821 A1 | 3/2009 | Chaudhri et al. | |
| 2009/0128374 A1* | 5/2009 | Reynolds et al. | 341/33 |
| 2009/0237374 A1* | 9/2009 | Li | G06F 3/0414 345/174 |
| 2010/0020029 A1* | 1/2010 | Park et al. | 345/173 |
| 2010/0026647 A1* | 2/2010 | Abe | G06F 3/04883 345/173 |
| 2010/0039393 A1* | 2/2010 | Pratt | G06F 3/0236 345/173 |
| 2010/0079501 A1* | 4/2010 | Ikeda | G06F 3/0485 345/661 |
| 2010/0149124 A1* | 6/2010 | Kim | G06F 3/0416 345/173 |
| 2010/0171712 A1 | 7/2010 | Cieplinski et al. | |
| 2010/0188352 A1 | 7/2010 | Ikeda | |
| 2010/0193342 A1 | 8/2010 | Roh et al. | |
| 2010/0201644 A1* | 8/2010 | Ohshita | 345/173 |
| 2010/0229091 A1* | 9/2010 | Homma | G06F 3/04883 715/702 |
| 2010/0259481 A1 | 10/2010 | Oh | |
| 2011/0001718 A1 | 1/2011 | Oh | |
| 2011/0013049 A1* | 1/2011 | Thorn | G06F 3/0488 348/240.3 |
| 2011/0050588 A1* | 3/2011 | Li et al. | 345/173 |
| 2011/0260998 A1* | 10/2011 | Ludwig | 345/173 |
| 2013/0069889 A1* | 3/2013 | Pearce | G06F 3/0416 345/173 |
| 2013/0147706 A1* | 6/2013 | Kim | G06F 1/1626 345/156 |
| 2013/0257806 A1 | 10/2013 | Abe et al. | |
| 2014/0062924 A1 | 3/2014 | Wakai et al. | |
| 2014/0085240 A1 | 3/2014 | Kikuchi et al. | |

FOREIGN PATENT DOCUMENTS

| | | |
|---|---|---|
| JP | 2010-033455 | 2/2010 |
| JP | 2010-079802 | 4/2010 |
| JP | 2010-176332 | 8/2010 |
| KR | 100686562 | 2/2007 |
| KR | 100694989 | 3/2007 |
| KR | 1020090059079 | 6/2009 |
| KR | 1020100091148 | 8/2010 |
| RU | 2005 110 670 | 9/2005 |
| WO | WO 2010/036050 | 4/2010 |

OTHER PUBLICATIONS

Japanese Office Action dated Aug. 31, 2015 issued in a counterpart Application No. 2013-528117, 7 pages.

Russian Office Action dated Apr. 10, 2015 in a counterpart Application No. 2013115304.

Japanese Decision of Rejection dated May 9, 2016 issued in a counterpart Application No. 2013-528117, 4 pages.

Korean Office Action dated Jul. 7, 2016 issued in a counterpart Application No. 10-2010-0088041, 7 pages.

Russian Office Action dated Dec. 7, 2016 issued in a counterpart Application No. 2015144389, 13 pages.

European Search Report dated Dec. 20, 2016 issued in a counterpart Application No. 11823778.3-1959, 11 pages.

Korean Office Action dated Dec. 15, 2016 issued in a counterpart Application No. 10-2010-0088041, 5 pages.

* cited by examiner

HORIZONTAL SCROLL

LEFT OR RIGHT MOVEMENT

VERTICAL SCROLL

UP OR DOWN MOVEMENT

MOTION CONTROL TOUCH SCREEN METHOD AND APPARATUS

PRIORITY

This application claims priority under 35 U.S.C. §119(a) to Korean Patent Application No. 10-2010-0088041, filed on Sep. 8, 2010, in the Korean Intellectual Property Office, the disclosure of which is incorporated herein by reference.

BACKGROUND OF THE INVENTION

1. Field of the Invention

The present invention relates generally to a motion control method and apparatus in a touch screen device, and more particularly to a motion control method and apparatus based on differences in positions and pressures on a touch screen.

2. Description of the Related Art

A multimodal user interface has become important to increase a user's interaction experience in the use of mobile devices. The spread of multi-touch technology has expanded the market for mobile devices equipped with multi-touch screens. Thus, there is a demand for a user interface that enables users to more intuitively control a motion of an object on a touch-screen of a device.

SUMMARY OF THE INVENTION

The present invention provides a motion control method and apparatus providing a user interface enabling users to more intuitively control motion of an object on a touch-screen device.

According to an aspect of the present invention, a method of controlling a motion of an object on a touch screen of a device includes recognizing pressures at least two positions on the touch screen of the device, and controlling the motion of the object on the touch screen using a difference in pressure between the at least two recognized positions.

According to another aspect of the present invention, an apparatus for controlling a motion of an object on a touch screen of a device includes a recognition unit for recognizing pressures at least two positions on the touch screen of the device, and a processing unit for controlling the motion of the object on the touch screen using a difference in pressure between the at least two positions.

BRIEF DESCRIPTION OF THE DRAWINGS

The above and other features and advantages of the present invention will become more apparent from the following detailed description describing embodiments thereof with reference to the attached drawings in which.

DETAILED DESCRIPTION OF THE INVENTION

Figure 1A:
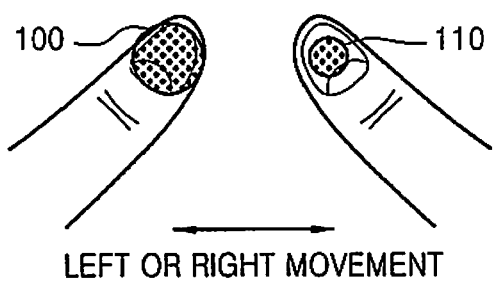
FIGS. 1A, 1B, and 1C are reference views conceptually illustrating the present invention.

The attached drawings illustrate embodiments of the present invention and are referred to in order to gain a sufficient understanding of the present invention, the merits thereof, and the objectives accomplished by the implementation of the present invention. Hereinafter, the present invention will be described in detail by explaining embodiments of the invention with reference to the accompanying drawings. Like reference numerals in the drawings denote like elements described herein.

Figure 1B:
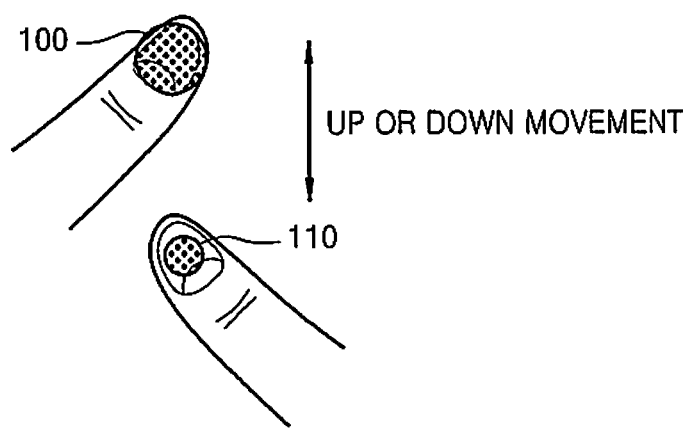
Figure 1C:
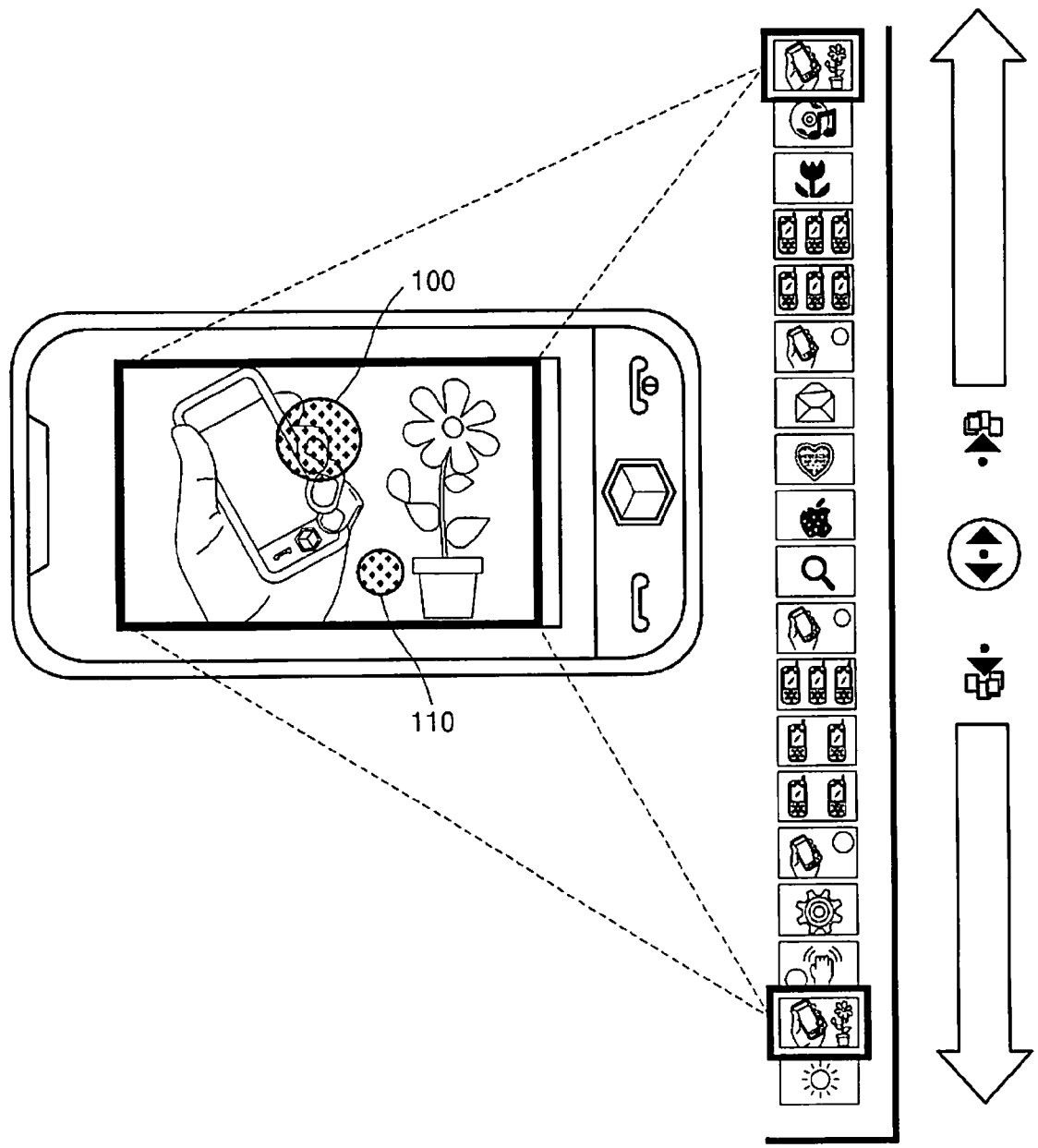

FIGS. 1A, 1B, and 1C are reference views conceptually illustrating the present invention. FIG. 1A illustrates an example of using two fingers to touch a touch screen of a device. When a user touches the touch screen of the device with at least two fingers where there is a difference in pressure between the at least two fingers touching the touch screen, the device can control a motion of an object according to the pressure difference.

Referring to FIG. 1A, two fingers are touching the touch screen of the device. The device recognizes a touch 100 of a first finger and a touch 110 of a second finger. When the device determines that the touch 100 of the first finger and the touch 110 of the second finger are arranged horizontally rather than vertically, the object is moved left or right in a direction toward one of the touch 100 of the first finger and the touch 110 of the second finger, depending on which has the higher pressure.

FIG. 1B illustrates another example of using two fingers to touch a touch screen of a device. Referring to FIG. 1B, the device recognizes the touch 100 of the first finger and the touch 110 of the second finger. When the device determines that the touch 100 of the first finger and the touch 110 of the second finger are arranged vertically rather than horizontally, the object is moved up or down in a direction toward one of the touch 100 of the first finger and the touch 110 of the second finger, depending on which has the higher pressure.

FIG. 1C illustrates an example of an application when the present invention is embodied in a mobile phone. Referring to FIG. 1C, two touches are made on a touch screen of the mobile phone. The touch 100 and the touch 110 are arranged vertically rather than horizontally in view of the positional relationship between them so that an object may be moved up or down. When a pressure of the touch 100 is greater than that of the touch 110, the motion of the object may be controlled to be moved toward the touch 100. Thus, in FIG. 1C, which illustrates a vertical scroll, the scroll may be moved in an upward direction, that is, toward the touch 100, rather the touch 110. According to the present invention, the positions and inputs of at least two touches on the touch screen in the device including the touch screen are recognized, and thus, the movement of an object may be more intuitively and conveniently controlled.

Figure 2:
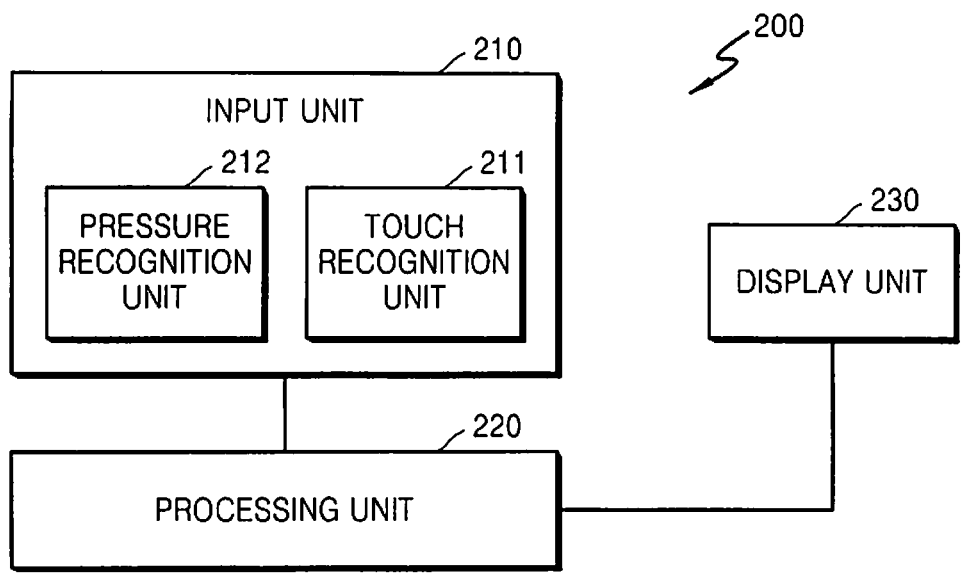
FIG. 2 is a schematic block diagram of a motion control apparatus according to an embodiment of the present invention.

FIG. 2 is a schematic block diagram of a motion control apparatus 200 according to an embodiment of the present invention. Referring to FIG. 2, the motion control apparatus 200 includes an input unit 210, a processing unit 220, and a display unit 230.

The input unit 210 is configured to receive and recognize an input of a user and includes a touch recognition unit 211 and a pressure recognition unit 212 according to the present invention. The touch recognition unit 211 recognizes at least two touches on a touch screen and also the positions of the touches. The pressure recognition unit 212 is a device that recognizes a pressure at a touch position. Any type of a device capable of recognizing a pressure may be employed as the device for recognizing a pressure in the pressure recognition unit 212. For example, a plurality of pressure sensors may be installed to recognize a pressure, or when an area of a touch portion increases by reading the shape of a touch portion in a touch screen, the touch portion may be recognized as one having a high intensity of pressure. Also, the intensity of pressure may be recognized by analyzing the strength of a signal generated when a touch occurs on a capacitive touch screen. Further, the pressure recognition unit 212 may be embodied by a combination of various technologies for recognizing a touch point and a pressure on the touch screen at the same time.

The processing unit 220 processes information received from the input unit 210 and controls a movement of an object displayed on the display unit 230 based on a result of the processing. The display unit 230 displays the movement of an object under the control of the processing unit 220. Any type of device capable of performing a display function may be employed as the display unit 230.

Although not illustrated in FIG. 2, an interface may be further provided to transmit a signal received from the input unit 210. That is, the interface preferably transmits information about the position and pressure of a touch on the touch screen to the processing unit 220. Also, a storage unit for storing information or data processed by the processing unit 220 may be further provided.

Figure 3:
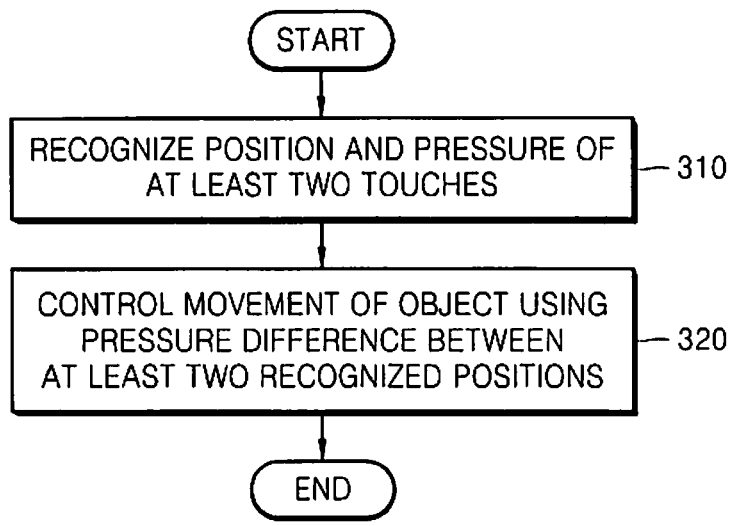
FIG. 3 is a flowchart of a motion control method according to an embodiment of the present invention.

FIG. 3 is a flowchart of a motion control method according to an embodiment of the present invention. Referring to FIGS. 2 and 3, the input unit 210 recognizes the positions and pressures of at least two touches on the touch screen in step 310. The touch recognition unit 211 included in the input unit 210 recognizes positions of at least two touches on the touch screen. The pressure recognition unit 212 recognizes a pressure at a corresponding touch position. The input unit 210 transmits information about the positions and pressures of the at least two recognized touches on the touch screen to the processing unit 220.

The processing unit 220 controls the movement of an object on the touch screen by using a difference in pressure between at least two recognized positions in step 320.

When receiving the information about the position and pressure of a recognized touch from the input unit 210, the processing unit 220 analyzes information about the position and pressure of the touch, generates a signal to control a movement of an object on a touch screen, and provides the signal to the display unit 230. That is, the processing unit 220 determines a direction of the movement of the object on the touch screen by analyzing information about the positions of the at least two touches recognized on the touch screen. Further, the processing unit 220 determines a speed or strength of the movement of the object on the touch screen by analyzing information about the pressures of the at least two touches recognized on the touch screen.

When pressures due to two or more touches are recognized, a difference in pressure between the two or more touches may not be effective and may not result in a user input according to the motion control method of the present invention. For example, although two pressures are recognized on the touch screen, a difference between the two pressures may be so small so that the pressures may be regarded as typical inputs occurring when the touch screen is held by two fingers, such as when the user holds the touch screen in a normal manner, rather than as user inputs to which the motion control method of the present invention is to be applied. Thus, although it is not illustrated in FIG. 3, an operation of disregarding such an input may be included because a difference between the two pressures is not a meaningful value.

Specifically, the processing unit 220 monitors a pressure difference between the touches of two fingers when a user places fingers on the touch screen in a normal manner, calculates a pressure difference when the device is deemed to be held in a normal manner, and stores a calculated pressure difference as a critical value. When a pressure difference between two or more touches is analyzed by the motion control method according to the present invention, if the pressure difference is smaller than the stored critical value, the pressure difference is determined as one occurring when a user holds the device in a normal manner, rather than as a user input for motion control so that a signal due to the touch is not used for the motion control of an object. If the pressure difference between the recognized two or more touches is greater than the critical value, the pressure difference is determined as a user input for motion control, not as one occurring when a user holds the device in a normal manner, so that the motion control of an object may be performed using the pressure difference.

The critical value can be a predetermined value set in the apparatus 200. For example, the critical value can be set to a value of pressure difference between the two or more touches when users grab the apparatus 200 in the normal manner. Further, it is possible to adjust the critical value, which has been set in the apparatus 200, using a user interface in which the users can change the critical value.

The method of analyzing the information about the position and pressure of a touch in the processing unit 220 and using the information for motion control of an object on the touch screen is described below in detail with reference to the accompanying drawings.

Figure 4A:
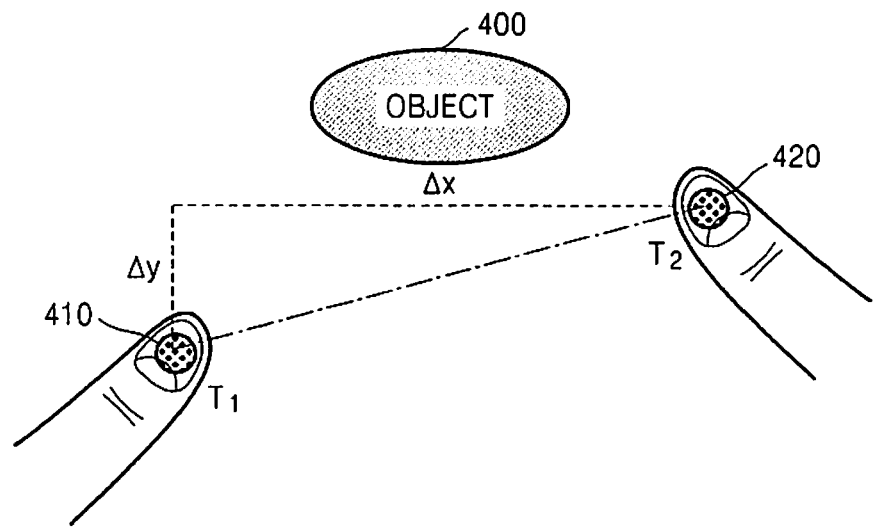
FIGS. 4A, 4B, and 4C illustrate an embodiment in which movement or deformation of an object on a touch screen is limited to X and Y axes.
Figure 4B:
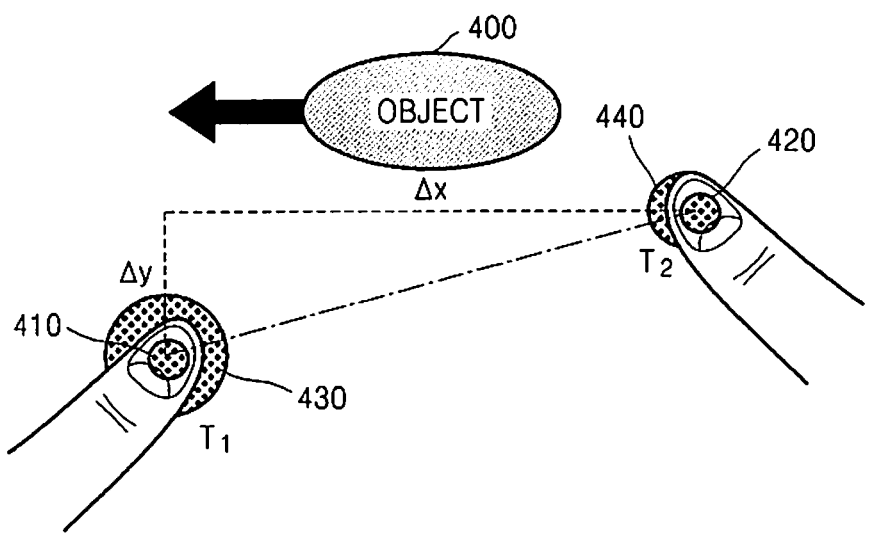
Figure 4C:
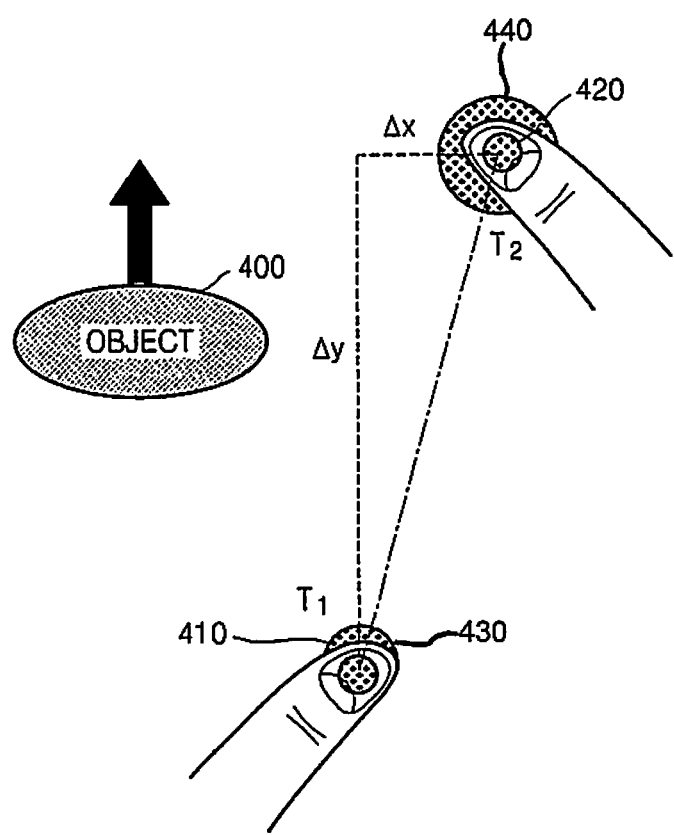

FIGS. 4A, 4B, and 4C illustrate an embodiment in which movement or deformation of an object on a touch screen is limited to X and Y axes. Examples in which the movement or deformation of an object on a touch screen is limited to X and Y axes, may be a vertical scroll list, a horizontal scroll list, or movement on a progress bar indicating volume or motion picture/music progression.

Referring to FIG. 4A, an object 400 is displayed on a touch screen and touches of two fingers are positioned under the object 400. The position of a first touch 410 is T1, while the position of a second touch 420 is T2. When coordinates of T1 are (x1, y1) and coordinates of T2 are (x2, y2), $\Delta x$ is a distance between x2 and x1, that is, a distance on the X axis, and $\Delta y$ is a distance between y2 and y1, that is, a distance on the Y axis.

The processing unit 220 determines a movement axis of the object, that is, whether to move the object on the X axis or Y axis. When the distance of the X axis is longer than the distance of the Y axis, the object is determined to be moved on the X axis. When the distance of the Y axis is longer than the distance of the X axis, the object is determined to be moved on the Y axis.

Also, the processing unit 220 may determine as follows a movement direction of the object, that is, whether to move the object toward T1 or T2, based on a pressure input by the touches of at least two fingers.

By comparing a pressure P1 (not shown) at T1 with a pressure P2 (not shown) at T2, the object is moved to T1 when P1 is greater than P2, and the object is moved to T2 when P2 is greater than P1. When P1 is the same as P2, the object is not moved.

Also, the processing unit 220 may determine as follows a movement speed, that is, pixel movement per hour, of an object. Specifically, the processing unit 220 is preferably determined by a movement speed of an object according to k×|P2−P1|. Here, "k" denotes a constant determined by the characteristic of an application, and "x" denotes a multiplication function. That is, when a difference between the two pressures is great, a movement speed is increased. When a difference between the two pressures is small, the movement speed is decreased.

Also, the processing unit 220 may determine the movement speed of an object according to time. That is, the processing unit 220 may determine the movement speed of an object in proportion to a time t during which a touch is maintained.

Referring to FIG. 4B, since the distance between the first touch 410 and the second touch 420 on the X axis is longer than that on the Y axis, the object is determined to be moved on the X axis. Further, since the pressure of the first touch 410 is greater than that of the second touch 420, the object is determined to be moved toward the first touch 410. The fact that the pressure of the first touch 410 is greater than that of the second touch 420 is illustrated by the size of a circle 430 whose center is at the center of the first touch 410 being larger than that of a circle 440 whose center is at the center of the second touch 420, as illustrated in FIG. 4B.

Referring to FIG. 4C, since the distance between the first touch 410 and the second touch 420 on the Y axis is longer than that on the X axis, the object is moved on the Y axis. Also, since the pressure of the second touch 420 is greater than that of the first touch 410, as indicated by the difference in size of a circle 440 as compared to a circle 430, the object is determined to be moved toward the second touch 420.

Figure 5A:
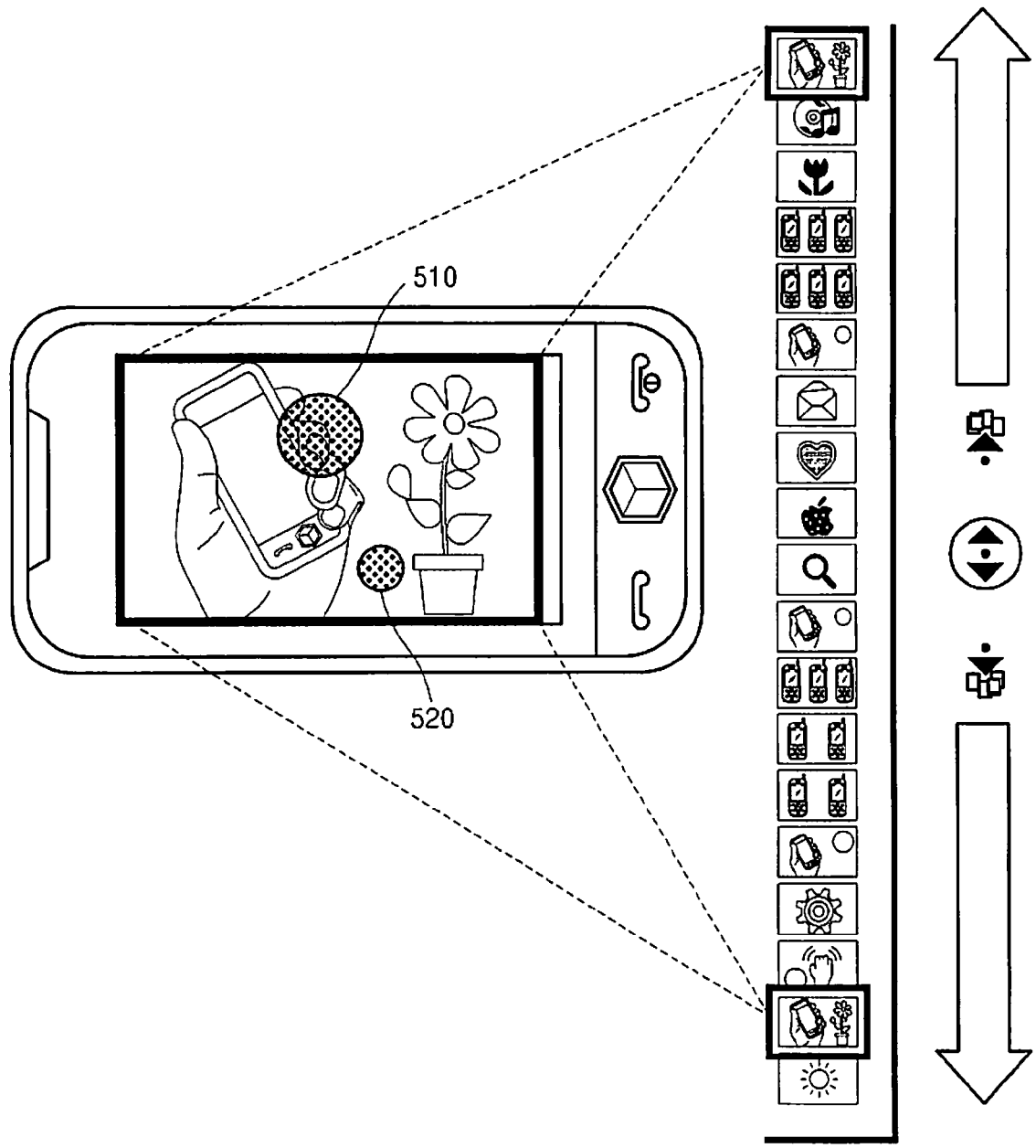
FIGS. 5A, 5B, 5C, 5D, and 5E illustrate an example of specific applications when movement or deformation of an object on a touch screen is generated on the X and Y axes.

FIGS. 5A, 5B, 5C, 5D, and 5E illustrate examples of specific applications when movement or deformation of an object on a touch screen is generated on the X and Y axes. Referring to FIG. 5A, an example of a vertical scroll is illustrated as a user generates two touches 510 and 520 on a touch screen and creates a difference in pressure, as indicated by the difference in size of touches 510 and 520, between the two touches 510 and 520 in a vertical direction. That is, when the touch screen is touched with two fingers, a scrolling function is performed in an upward direction when a higher pressure is applied to the upper touch 510, and a scrolling function is performed in a downward direction when a higher pressure is applied to the lower touch 520.

Figure 5B:
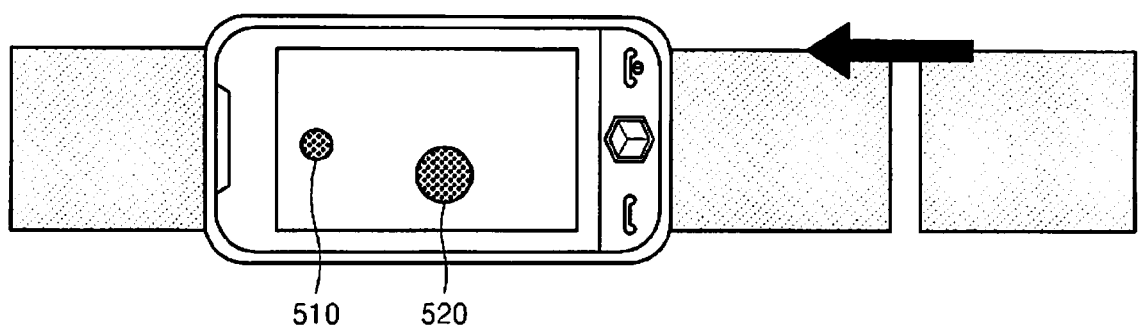

Referring to FIG. 5B, a horizontal scroll may be embodied where a user generates two touches 510 and 520 on a touch screen and creates a difference in pressure between the two touches 510 and 520 in a horizontal direction. That is, when the touch screen is touched with two fingers, a scrolling function is performed to the right when a higher pressure is applied to the right touch 520, and a scrolling function is performed to the left when a higher pressure is applied to the left touch 510.

Figure 5C:
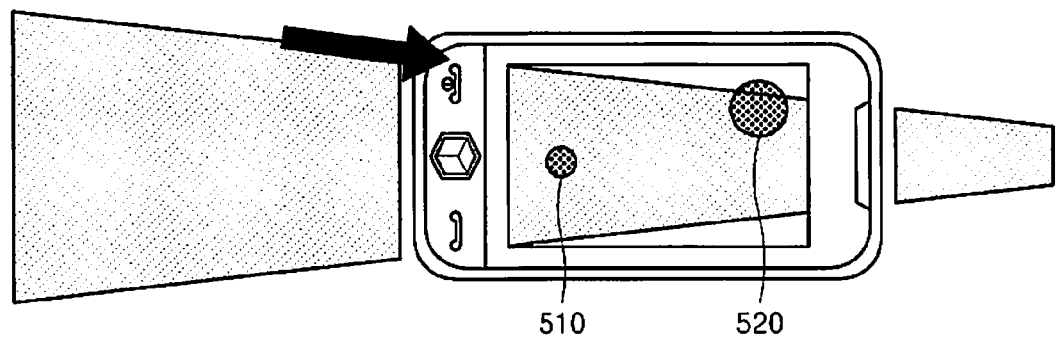

Referring to FIG. 5C, an application having a predetermined effect may be embodied, in addition to simple scrolling as illustrated in FIG. 5A or 5B. Specifically, a graphic object is deformed, i.e. altered or changed, in a direction in which a pressure is applied, thereby producing a sense that the graphic object moves back, which is employed as an effect during scrolling.

Figure 5D:
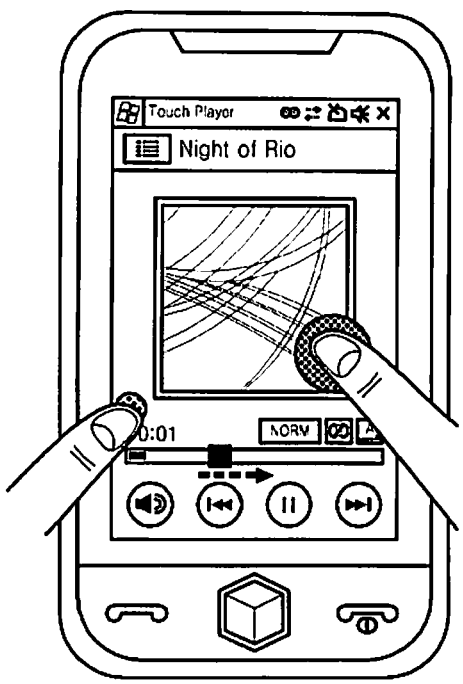

Referring to FIG. 5D, when an application for providing music or a motion picture is executed, the music or motion picture may be searched for by using the pressure difference between two touches according to the present invention as a search function.

Figure 5E:
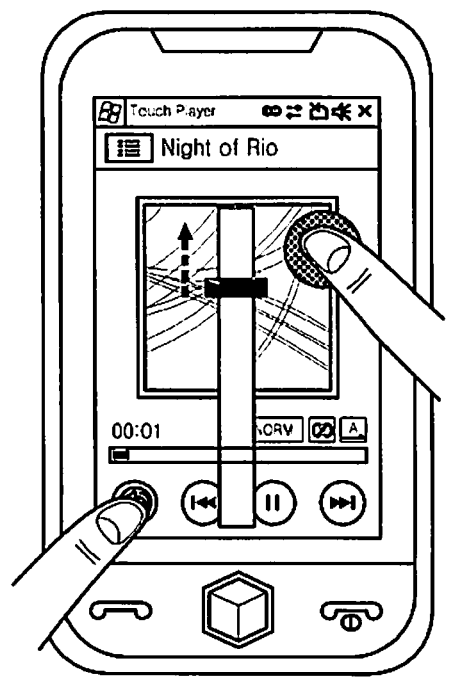

Referring to FIG. 5E, when an application for providing music or a motion picture is executed, volume control may be possible by using the pressure difference between two touches according to the present invention.

In the above description, an example in which the movement of the object on the touch screen is limited to the X and Y axes is described with reference to FIGS. 4 and 5.

Figure 6A:
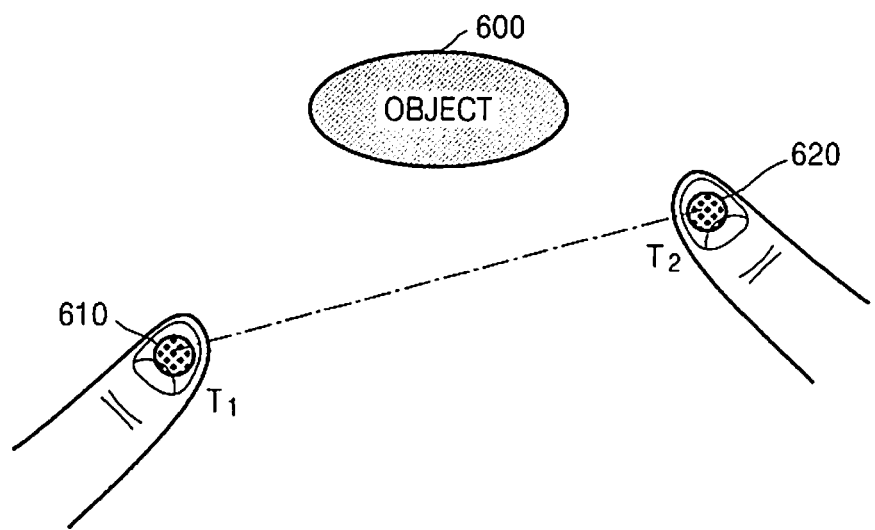
FIGS. 6A, 6B, and 6C illustrate a case in which movement or deformation of an object on a touch screen is freely generated without being limited to X and Y axes.
Figure 6B:
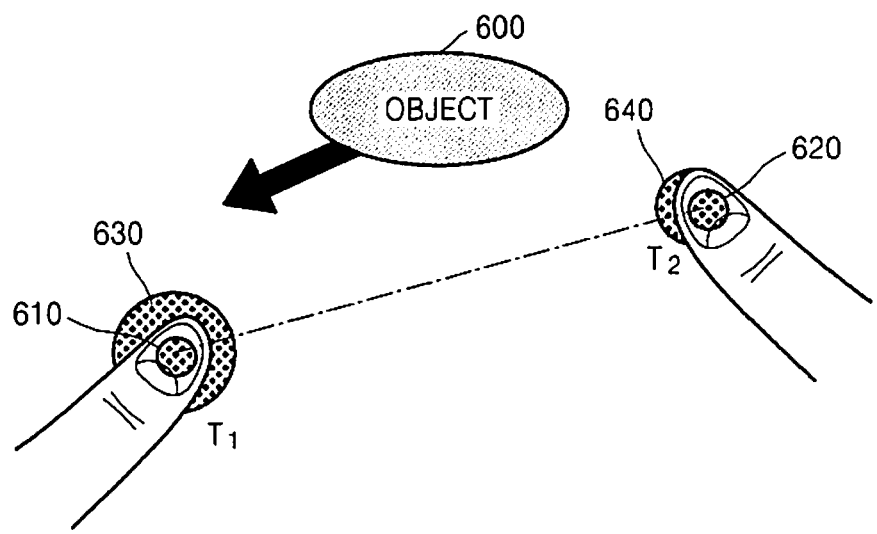
Figure 6C:
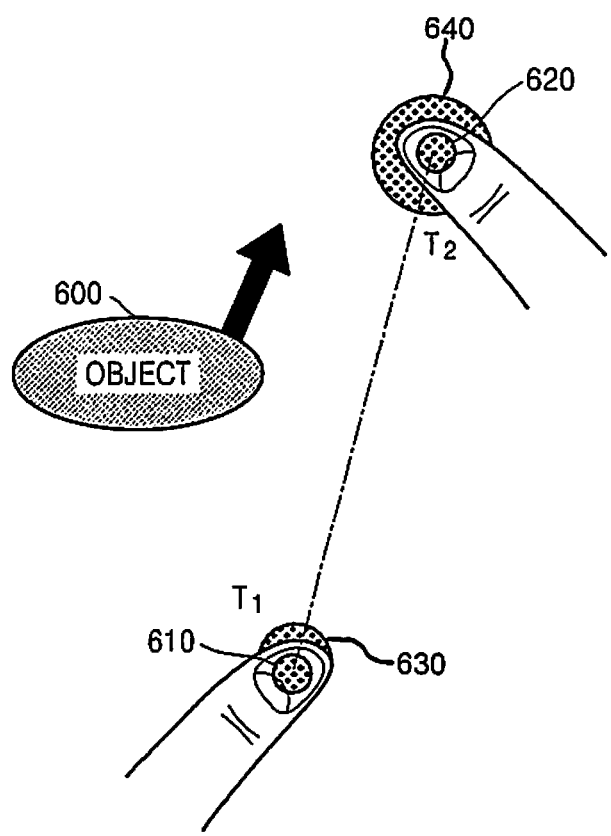

FIGS. 6A, 6B, and 6C illustrate an embodiment in which movement or deformation of an object on a touch screen is freely generated without being limited to either the X or Y axes. When the movement, deformation, or motion of an object on the touch screen is free, the object may move on the touch screen not only on either the X or Y axis but also in any other direction on the touch screen. For example, an enlarged photo may be panned or a map may be navigated.

Referring to FIG. 6A, an object 600 is displayed on the touch screen and touches of two fingers are positioned under the object 600. The position of a first touch 610 is T1 and the position of a second touch 620 is T2.

Since the processing unit 220 can control a movement of an object in any direction, and is not limited to either the X or Y axes, a movement direction is directly determined without determining a movement axis. The processing unit 220 may determine as follows the movement direction of an object, that is, whether to move the object toward T1 or T2.

By comparing a pressure P1 (not shown) at T1 with a pressure P2 (not shown) at T2, when P1 is greater than P2, the object is determined to be moved toward T1. When P2 is greater than P1, the object is determined to be moved toward T2. When P1 is the same as P2, it is determined that there is no movement of the object.

Also, the processing unit 220 determines as follows a movement speed of the object, that is, pixel movement per hour. That is, the processing unit 220 may determine a movement speed of the object according to k×|P2−P1|. Here, "k" denotes a constant determined by the characteristic of an application. That is, when a difference between the two pressures is great, a movement speed of the object is increased. When a difference between the two pressures is small, the movement speed of the object is decreased.

Referring to FIG. 6B, since the pressure of the first touch 610 is higher than that of the second touch 620 between the first and second touches 610 and 620, the object may be determined to be moved toward the first touch 610. The fact that the pressure of the first touch 610 is greater than that of the second touch 620 is illustrated by the size of a circle 630 whose center is at the center of the first touch 610 being larger than that of a circle 640 whose center is at the center of the second touch 620, as illustrated in FIG. 6B.

Referring to FIG. 6C, since the pressure of the second touch 620 is greater than that of the first touch 610, as indicated by the difference in size of a circle 640 as compared to a circle 630, the object may be determined to be moved toward the second touch 620.

Figure 7A:
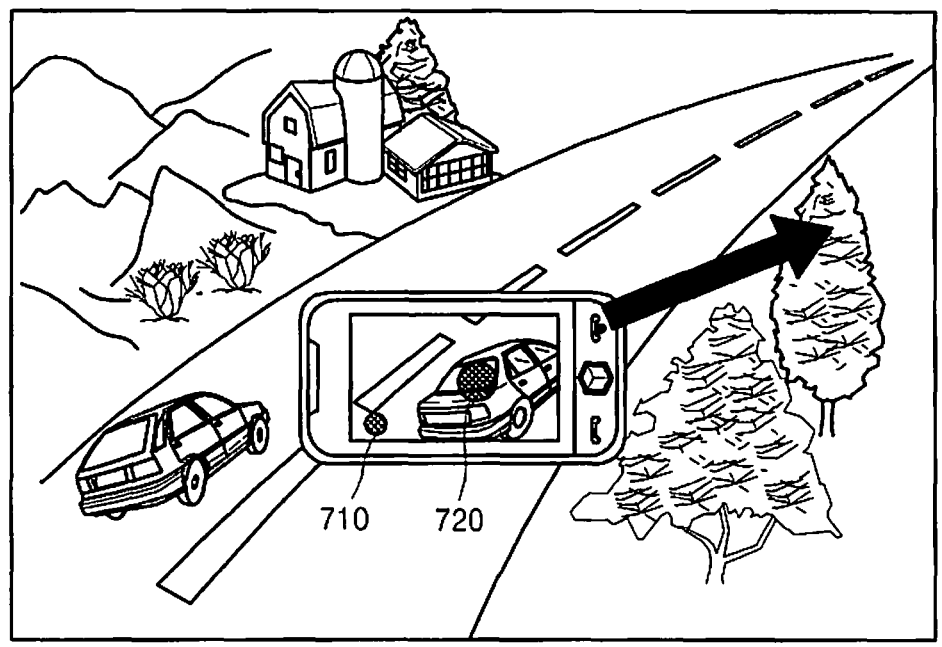
FIGS. 7A and 7B illustrate an example of specific applications when movement or deformation an object on a touch screen is freely generated.
Figure 7B:
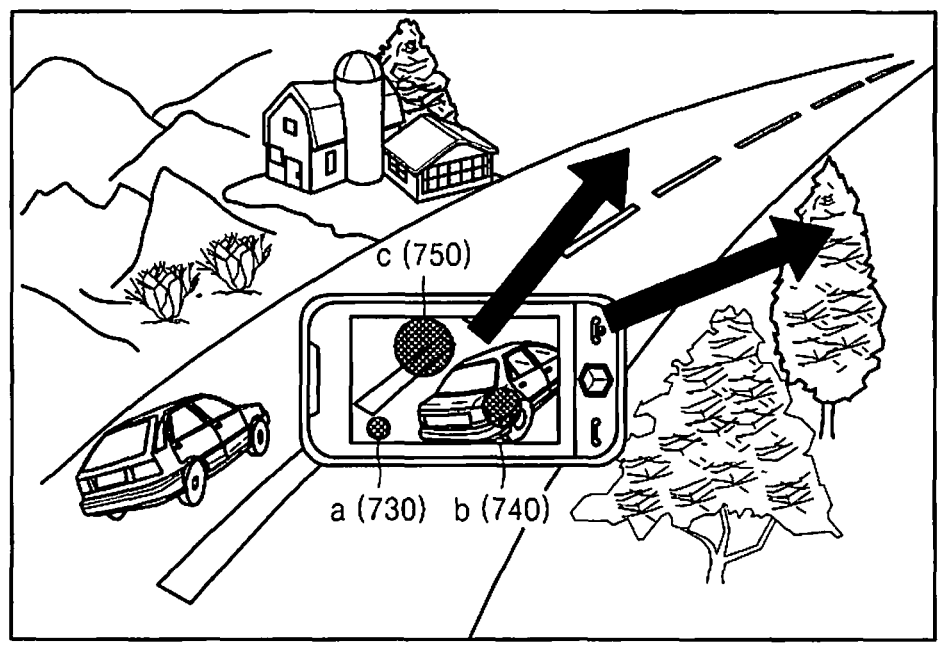

FIGS. 7A and 7B illustrate an example of specific applications when movement or deformation of an object on a touch screen is freely generated. FIG. 7A illustrates an application during a panning operation in a photo. A first touch 710 and a second touch 720 are illustrated on a touch screen of a device. The photo is panned in a direction toward the second touch 720 having a larger pressure than the first touch 710.

FIG. 7B illustrates an application of displaying a photo in a device as in FIG. 7A. However, the difference between FIG. 7A and FIG. 7B is that there are three touch points; a) 730, b) 740, and c) 750, on the touch screen. When pressures due to two or more touches on the touch screen are recognized as in FIG. 7B, a direction of movement of the object may be determined by a vector.

Specifically, a method of determining the direction of a movement of an object using a vector is as follows.

When a (n+1) number of pressures are recognized on the touch screen, coordinates of a point having the lowest pressure are A0(x0,y0) and coordinates of a point having the highest pressure are An(xn,yn). Also, a pressure value of the point having the lowest point is p0 and a pressure value of a point having the highest pressure is pn.

According to Equation 1, when the direction of An is θn with respect to A0:

$$\cos \theta n = (xn-x0)/\sqrt{(xn-x0)^2+(yn-u0)^2}$$

$$\sin \theta n = (yn-y0)/\sqrt{(xn-x0)^2+(yn-u0)^2} \quad (1)$$

According to Equation 2, when the amount of a pressure is (pn−p0), a vector Fn representing An may be expressed as follows:

$$Fn=(pn-p0)(\cos \theta n, \sin \theta 0) \quad (2)$$

Thus, when pressures due to two or more touches are recognized on the touch screen, the direction of the object may be determined to be (cos θn, sin θ0) and the movement speed of the object may be determined to be k·(pn−p0). Here, "k" denotes a constant according to an application.

As described above, according to the present invention, since the motion of an object is controlled using a difference in pressure between two or more touches on a touch screen in a device, a user is provided with a new interaction experience. Also, since an intuitive and fast operation method is provided to the user, a distinguished function may be provided. Further, an iconic interaction method may be advantageous in terms of product marketing.

The present invention may be applied to any product having a touch screen, for example, hand held products (HNPs), MP3 players, tablets, personal digital assistants (PDAs), mobile devices, etc.

The invention may also be embodied as computer readable codes on a computer readable recording medium. The computer readable recording medium is any non-transitory data storage device that can store data which can be thereafter read by a computer system. Examples of the computer readable recording medium include read-only memory (ROM), random-access memory (RAM), CD-ROMs, magnetic tapes, floppy disks, optical data storage devices, etc. The computer readable recording medium may also be distributed over network coupled computer systems so that the computer readable code is stored and executed in a distributed fashion. Also, functional programs, codes, and code segments for accomplishing the present invention may be easily construed by programmers of ordinary skill in the art to which the present invention pertains.

While this invention has been particularly shown and described with reference to certain embodiments thereof, it will be understood by those of ordinary skill in the art that various changes in form and details may be made therein without departing from the spirit and scope of the invention as defined by the appended claims.

What is claimed is:

1. A method of controlling movement of a position of an object displayed on a touch screen of a device, the method comprising:
   recognizing intensities of pressure at two or more static positions presented concurrently on the touch screen of the device; and
   controlling the movement of the position of the object on the touch screen using a difference in intensities of pressure between the two or more recognized static positions when the difference is greater than a predetermined critical value,
   wherein controlling the movement of the position of the object comprises:
   comparing a distance on a first axis with a distance on a second axis between the two or more static positions;
   determining the movement of the position of the object to be in the first axis when the distance on the first axis is longer than the distance on the second axis, or the second axis when the distance on the second axis is longer than the distance on the first axis; and
   scrolling the object on the touch screen on which the intensities of pressure at two or more static positions were presented concurrently in the determined movement of the position of the object.

2. The method of claim 1, wherein determining the motion movement of the position of the object comprises:
   determining a direction of the movement of the position of the object to be toward a position having a higher pressure when there are only two static positions; and
   determining the direction of the movement of the position of the object by using a vector when there are three or more static positions.

3. The method of claim 1, wherein controlling the movement of the position of the object further comprises determining a speed of the movement of the position of the object using a difference in intensity of pressure between the two or more static positions.

4. The method of claim 2, wherein the vector for the direction of motion is determined using coordinates of a static position having the lowest pressure and coordinates of a static position having the highest pressure.

5. The method of claim 1, further comprising determining a speed or strength of the linear movement of the object on the touch screen by analyzing information of the intensities of pressure at the two or more static positions.

6. The method of claim 1, further comprising:
   monitoring a pressure difference between the intensities of pressure at two or more static positions to determine the pressure difference when the device is held normally;
   storing the determined pressure difference as the critical value; and
   only controlling the linear movement of the object if the difference between the recognized intensities of pressure at two or more static positions is greater than the critical value.

7. An apparatus for controlling movement of a position of an object displayed on a touch screen of a device, the apparatus comprising:
   a recognition unit configured to recognize intensities of pressure at two or more static positions presented concurrently on the touch screen of the device; and
   a processing unit configured to control the movement of the position of the object on the touch screen using a difference in intensities of pressure between the two or more static positions when the difference is greater than a predetermined critical value, by comparing a distance on a first axis with a distance on a second axis between the two or more static positions, determining the movement of the position of the object to be in the first axis when the distance on the first axis is longer than the distance on the second axis, or the second axis when the distance on the second axis is longer than the distance on the first axis, and scrolling the object on the touch screen on which the intensities of pressure at two or more static positions were presented concurrently in the determined movement of the position of the object, wherein the object is persistent before and after pressure is applied to the touch screen.

8. The apparatus of claim 7, wherein the processing unit determines a direction of the movement of the position of the object to be toward a position having a higher pressure when there are only two static positions, and determines the direction of the movement of the position of the object by using a vector when there are three or more static positions.

9. The apparatus of claim 7, wherein the processing unit determines a speed of the movement of the position of the object using a difference in intensity of pressure between the two or more static positions.

10. The apparatus of claim 8, wherein the vector for the direction of the movement of the position is determined using coordinates of a static position having the lowest pressure and coordinates of a static position having the highest pressure.

11. The apparatus of claim 7, wherein the processing unit is further configured to determine a speed or strength of the linear movement of the object on the touch screen by analyzing information of the intensities of pressure at the two or more static positions.

12. The apparatus of claim 7, wherein the processing unit is further configured to:
monitor a pressure difference between the intensities of pressure at two or more static positions to determine the pressure difference when the device is held normally;
store the determined pressure difference as the critical value; and
only control the linear movement of the object if the difference between the recognized intensities of pressure at two or more static positions is greater than the critical value.

13. A method of controlling movement of a position of an object displayed on a touch screen of a device, comprising:
recognizing pressures at two or more static positions presented concurrently on the touch screen of the device; and
controlling the movement of the position of the object on the touch screen using a difference in pressure between the two or more recognized static positions when the difference is greater than a predetermined critical value, wherein the movement of the position of the object is constrained to one of two orthogonal axes,
wherein the two orthogonal axes comprise a first axis and a second axis, and
wherein controlling the movement of the position of the object comprises:
comparing a distance on the first axis with a distance on the second axis between the two or more static positions;
determining the movement of the position of the object to be in the first axis when the distance on the first axis is longer than the distance on the second axis, or the second axis when the distance on the second axis is longer than the distance on the first axis; and
scrolling the object on the touch screen on which the intensities of pressure at two or more static positions were presented concurrently in the determined movement of the position of the object.

14. The method of claim 13, further comprising determining a speed or strength of the linear movement of the object on the touch screen by analyzing information of the intensities of pressure at the two or more static positions.

15. The method of claim 13, further comprising:
monitoring a pressure difference between the intensities of pressure at two or more static positions to determine the pressure difference when the device is held normally;
storing the determined pressure difference as the critical value; and
only controlling the linear movement of the object if the difference between the recognized intensities of pressure at two or more static positions is greater than the critical value.

16. An apparatus for controlling movement of a position of an object displayed on a touch screen of a device, comprising:
a recognition unit configured to recognize pressures at two or more static positions presented concurrently on the touch screen of the device; and
a processing unit configured to control the movement of the position of the object on the touch screen using a difference in pressure between the two or more static positions when the difference is greater than a predetermined critical value, wherein the movement of the position of the object is constrained to one of two orthogonal axes,
wherein the two orthogonal axes comprise a first axis and a second axis, and
wherein the processing unit is further configured to:
compare a distance on the first axis with a distance on the second axis between the two or more static positions;
determine the movement of the position of the object to be in the first axis when the distance on the first axis is longer than the distance on the second axis, or the second axis when the distance on the second axis is longer than the distance on the first axis; and
scrolling the object on the touch screen on which the intensities of pressure at two or more static positions were presented concurrently in the determined movement of the position of the object.

17. The apparatus of claim 16, wherein the processing unit is further configured to determine a speed or strength of the linear movement of the object on the touch screen by analyzing information of the intensities of pressure at the two or more static positions.

18. The apparatus of claim 16, wherein the processing unit is further configured to:
monitor a pressure difference between the intensities of pressure at two or more static positions to determine the pressure difference when the device is held normally;
store the determined pressure difference as the critical value; and
only control the linear movement of the object if the difference between the recognized intensities of pressure at two or more static positions is greater than the critical value.

* * * * *